Feb. 6, 1968  R. WANNER  3,367,460
COUPLING WITH CUSHIONED LATCH
Filed June 7, 1965  3 Sheets-Sheet 1

Rudolph Wanner
INVENTOR.

BY Ross & Mestern

Attorney

United States Patent Office 3,367,460
Patented Feb. 6, 1968

3,367,460
COUPLING WITH CUSHIONED LATCH
Rudolph Wanner, 6–7 Memminger Strasse,
89 Augsburg, Germany
Filed June 7, 1965, Ser. No. 462,025
3 Claims. (Cl. 192—24)

ABSTRACT OF THE DISCLOSURE

Shaft coupling comprising a driving shaft and a driven shaft in continuous frictional engagement and a ratchet wheel carried by the driven shaft, a positioning pawl engageable with the teeth of this wheel to retain it upon stopping, and a further pawl engageable with its abutment surface against the surface of a selected tooth under the control of a programmer, at least one of these surfaces being spring-biased and yieldable under the impact of the second pawl while having fluid damping means to absorb the shock. The fluid damping means includes a plunger slidable in a fluid cylinder against a spring force, the cylinder wall having an elongated triangular shape vent cooperating with the plunger to reduce the gas-escape opening upon advance of the plunger under the impact.

---

The invention relates to a coupling for fast-running parts of industrial machinery, such as paper feed mechanisms, with a friction coupling providing constant frictional contact between the driving and driven shafts and an arresting device for stopping the driven shaft as and when required.

In all machinery used for carrying out intermittent operations, it is necessary to provide the driving shafts with devices whereby the working parts can be brought to a standstill and their movements can be caused to begin and end with precision. Devices which enable such motions to be controlled in this way will be described as couplings for the purposes of the invention.

The invention is hereinafter described by way of example by reference to the feed mechanism of a paper cutting machine. It should be emphasized, however, that the invention can equally well be applied to other industrial machines.

With many paper cutting machines or machines used for carrying out other operations on paper, the aim is to advance the run of paper step by step, by means of the feed mechanism, so that the transverse cut or other operation may be completed while the paper is at rest. Numerous mechanisms exist whereby such motion can be imparted. As a rule, the length of paper is moved with the aid of rubber rollers, so that the problem reduces itself to one of suitably controlling the rotation of these rollers. Another known method is to keep the rubber rollers turning continuously and to throw them out of engagement with the paper by the use of gearing to bring the paper to a standstill.

These mechanisms, however, are not suitable for use on paper cutting machines, which have to make very heavy cuts. The moving parts are then too massive to allow the number of strokes per unit time to be increased.

A problem with such machines, furthermore, lies in the fact that the quality of the work must not suffer as a result of increases in speed and the consequent rise in output. This problem is particularly accentuated in the case of paper cutting and tabulating machinery and the like, since the transverse cut is required to be made with precision in relation to the printing on the paper. If there is any possibility, such as exists with the mechanisms known hitherto, of an uncontrollable slip being between the gearing and/or the rubber rollers, these cutting machines cannot be used, because the inaccuracy in the cut becomes particularly pronounced as the speed is increased. The same applies to office and organisational machines in which a succession of working operations have to be kept in precise register.

In many machines of this kind, therefore, the runs of paper used are provided with perforated edges, the holes all being the same distance apart. The feed mechanisms employed for these runs of paper usually consist of roller or chain components with similarly spaced pins, which engage in the paper perforations and so enable the paper to be accurately fed, without slip. However, should it be required to advance such runs of paper intermittently, the stopping of the drive once more raises considerable problems. The stopping of the entire drive mechanism calls for all the rotating masses to be brought to a sudden halt. There is no question of slowing them gradually, because that would mean a considerable waste of operating time.

It has now been found that when those fast-turning masses are stopped, the driven shafts and hence also the paper driving mechanism are subject to undesirable torsional oscillation, once the paper that is to be cut has acquired a certain speed. This torsional oscillation affects the position of the paper in relation to its feed mechanism. Each individual pin engaging in the border perforations of the paper has to be smaller in diameter than the hole in the paper, for generally there are several superimposed runs of paper being fed and cut, and it is unavoidable that there will be some lack of centralization of the holes in the edges of the paper. This slight relative displacement of the border perforations makes it necessary for the feed pins to be a trifle smaller. To ensure accuracy of cut, therefore, the pins must lie up against the same edge of the holes whenever the feed is stopped; nor may there be any play between the pins and these edges. It has been found, however, that the torsional oscillation hereinbefore referred to does result in play of this kind, the magnitude of which cannot be controlled. This in turn results in lack of precision in the advance of the paper to its next stopping position, so that the cut is not made in the theoretically desirable place.

The invention sets out to provide a coupling for particularly fast-running machinery—paper feed mechanisms, for example—such as will enable the output of these machines to be materially increased without any corresponding inaccuracies in the feed. Another important aim of the invention is to keep such a shaft coupling as simple as possible, in order to save constructional effort and to save expense. The invention is based on the use of a friction coupling in constant frictional engagement between the driving and the driven shaft, with an arresting device which halts the driven shaft when necessary.

The basic principle of the invention is that the arresting device has a damping mechanism for absorbing the jar of the stopping action. For the purpose of the invention, it is desirable for the friction coupling to contain at least one oil-impregnated felt friction disc of the known kind.

To obtain a high output from machinery of the kind referred to, there is one known method in which two couplings are used for two different speeds. Where long feeds are required, the major portion of the advance is first carried out with one coupling, a change-over to the other coupling being made just before the end of the stroke, to give a slower feed. Such an arrangement is very expensive, however, and cannot equal the performance of the mechanism according to the invention which reduces the rotary movement of the driven shaft smoothly to nil and is independent of the feeding speed.

The action of the mechanism of the invention provides for the use of a friction coupling of conventional kind for maintaining between the driving and the driven shaft, a continuous frictional contact, this contact being broken, however, when the driven side is held by the arresting device. With the driven side held, coincidentally with the halting of the run of paper, the friction coupling possesses the property that its members can turn in relation to each other, without any noteworthy degree of wear. It has been found that the oil-impregnated felt disc provides a particularly suitable means to this end. Nevertheless, the combination of this friction coupling with an arresting device would still not provide a complete solution to the problem with which the invention is concerned, since the violent shock arising from the stopping of the driven side might produce the torsional oscillation described earlier. To avoid this undesirable development, the invention also envisages the provision of a damping device, the purpose of which is to damp out the impact shock of the arresting device so that no time is wasted, though the shock is considerably reduced.

It is of particular advantage, and is included in the scope of the invention, for the damping device to be provided on a ratchet and pawl arresting mechanism, at least one of the arresting members of which has hydraulic damping. There are numerous possible ways in which this principle of the invention can be put into practice.

One such method is to associate two pawls with a single ratchet wheel, one pawl incorporating the hydraulic damping and being so controlled that it is engaged for whatever length of time is desired with the ratchet wheel, during the arresting action, before the other pawl engages. It is desirable to provide the shock-absorbing pawl with a plunger and cylinder, the cylinder having outlets through which the movement of the plunger causes the pressure fluid to flow into a chamber surrounding the cylinder. The outlets should preferably be triangular, so that the degree of shock absorption may vary with the length of stroke of the plunger.

Another variant included in the scope of the invention provides for the fitting of a plunger-like pin to the individual teeth of the ratchet wheel. This sliding pin is recessed into the impact face of the teeth, its free end forming a striking surface for a pawl and its rear end acting on a hydraulic cushion. This variant method admittedly suffers the disadvantage that every tooth in the ratchet wheel must be fitted with its own shock absorber.

It therefore appears better to apply the hydraulic damping to the pawl, by connecting the pawl bearing to a damped plunger. Then the number of teeth in the ratchet wheel makes no difference, since only the pawl is provided with the shock absorbing device.

It is naturally necessary that the pawls used as proposed according to the invention should be subject to particularly effective control. There are several ways in which various control systems can be adapted to them. As a rule, however, preference will be accorded to electrical or electronic control equipment, as these permit specially fast and reliable control of the pawls.

The invention is illustrated diagrammatically, by way of example only, in the accompanying drawings, in which.

Figure 1:
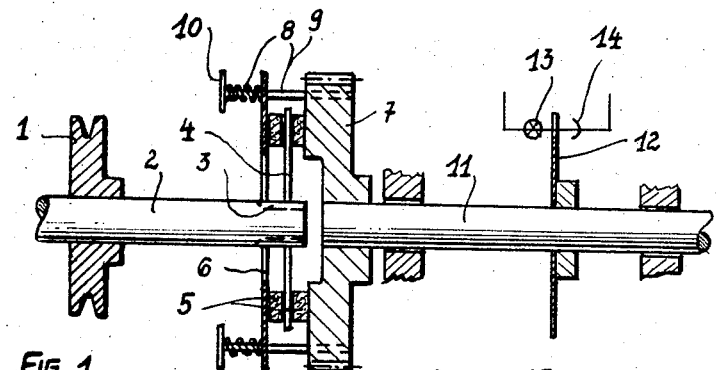
FIGURE 1 is a longitudinal section showing the basic principle of the shaft coupling of the invention.

The example shown in FIGURE 1 is an entirely diagrammatic representation of the layout of a coupling according to the invention, which is suitable for use, particularly in fast-running industrial machinery, for providing between the driving and the driven side a connection that can be repeatedly and rapidly broken. Driving shaft 2 derives its motion from pulley 1, which is driven by a V-bolt. Mounted on the end of the driving shaft 2 by means of keyways 3 is a friction coupling disc 4, provided with friction linings 5 on both faces. Oil-impregnated felt discs should preferably be used for the linings.

To the driven shaft 11, is secured the secondary coupling member 7, which may and preferably should also form a ratchet wheel for arresting driven shaft 11. Pin 9 serves to connect the coupling member 7 to the other coupling member 6, which is pressed by springs 8 against friction discs 5. The loading-on springs 8 can be regulated by means of adjusters 10. The friction setting should be adjusted, so that when driven shaft 11 is released, coupling member 7 is still carried round, without slip, by discs 6 and 5.

In accordance with the invention, some controlling device, such as, for example, control disc 12, programmed as to how far driven shaft 11 is to be rotated, may be fitted to driven shaft 11 itself. Controlling devices of this kind are known; they can be notched or cut away, stamped or otherwise marked, to enable an exploring device of some kind to count the marks and time the ending of the rotary movement. In the present instance, assuming the control disc 12 to be punched to give a specific cutting sequence, the punch marks are explored by photo-electric control device 13/14. The impulses resulting from this are employed to arrest secondary coupling member 7. Thus, when the position of control disc 12 corresponds to a position of driven shaft 11 at which the driven shaft 11 is required to be stepped immediately, a contact is made which causes secondary coupling member 7 or some other part of the mechanism to be arrested at once.

It will be immediately apparent that, the control device 12–14 being mounted in such an advantageous position on the driven shaft, it matters little whether coupling 4–10 be free from slip or whether its engagement or torque transmission be uneven, since driven shaft 11 will always necessarily be brought to a standstill only at the moment when control disc 12 has reached the position prescribed for the disengagement of the drive from shaft 11.

If such a driving arrangement were to be run at very high speed, however, the shock produced by the stopping of driven shaft 11 would lead to torsional oscillation and so cause inaccurate feeding of the paper. To reduce this shock, so that torsional oscillation can no longer arise, the invention provides for the locking of the ratchet wheel by means of which the shaft 11 is arrested to be subject to a means of shock absorption.

Figure 2:
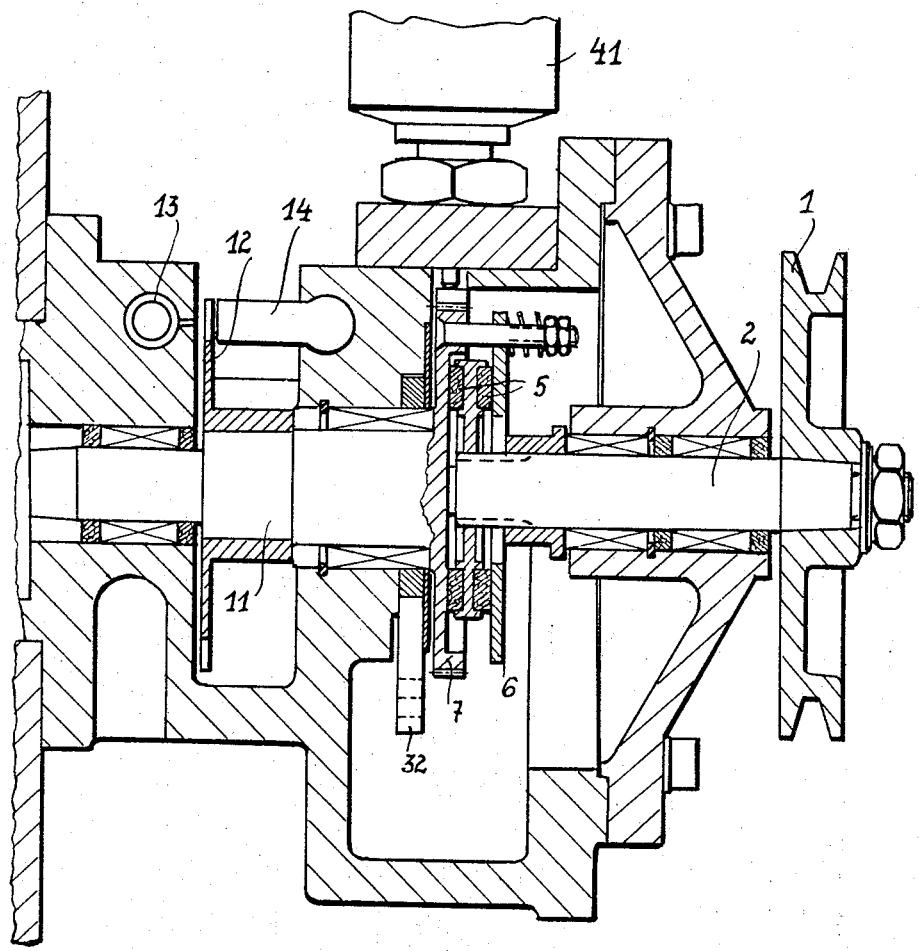
FIGURES 2 and 3 are longitudinal and transverse sectional elevations of one form of construction for a coupling such as shown in FIGURE 1.
Figure 3:
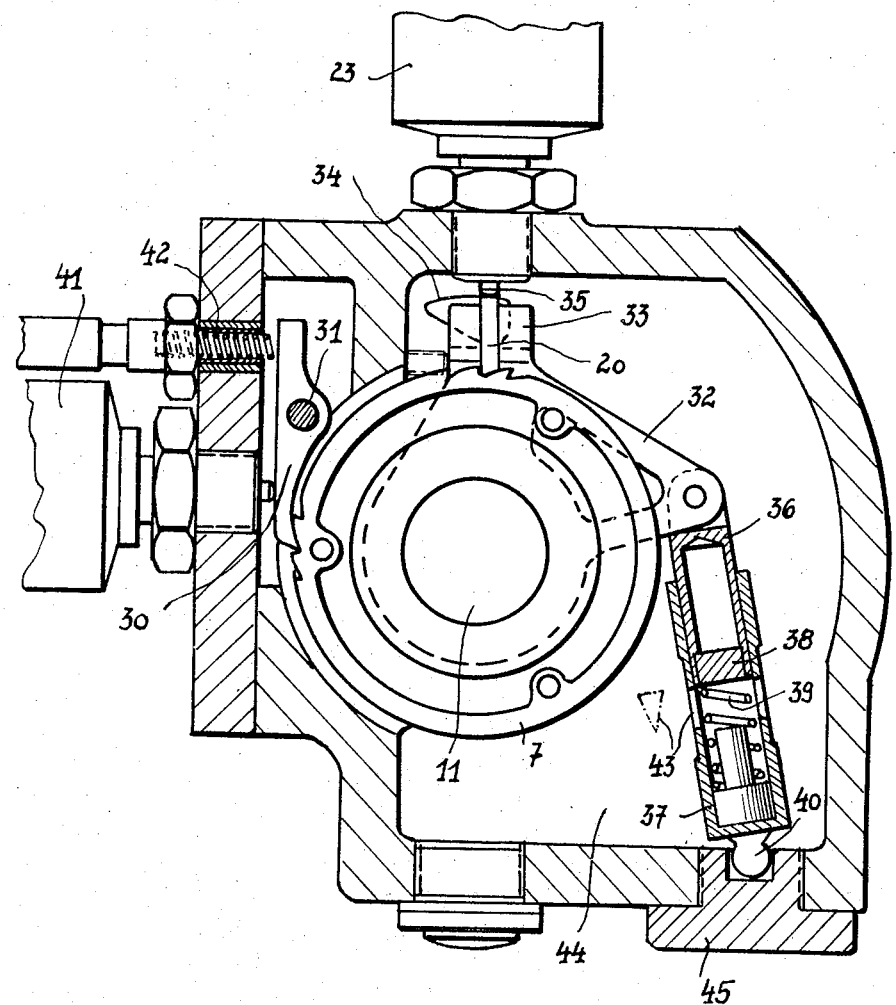

The example shown in FIGURES 2 and 3 is based on the provision of two pawls 20 and 30, which engage with ratchet wheel 7. Pawl 30, pivoted at 31, is of normal kind and determines the final position at which ratchet wheel 7 is arrested. The wheel 7 is operated by electromagnet 41 against the opposition of spring 42. To avoid the heavy jarring of impact with this pawl 30, spring-loaded pawl 20 is provided, which may be operated, for example, by electromagnet 23 and mounted on rocker arm 32, which swings about driven shaft 11. The rocker arm 32 has an extension 33, for the guiding of pawl 20, which itself has a cam 34, sliding on armature pin 35 of magnet 23.

When pawl 20 is engaged in the teeth of ratchet wheel 7, rocker arm 32 is carried round in the direction of rotation of the ratchet wheel and moves plunger rod 36, which extends into shock absorber 37 and is fitted with a plunger 38, which may for example, be spring-loaded (by spring 39). Shock absorber 37 may be swivel-jointed at 40. Its main purpose is to damp the shock of the impact between pawl 20 and ratchet wheel 7 until the other pawl 30, comes into contact with the appropriate numbers on ratchet wheel 7.

The cylindrical shock absorber contains slots 43, through which the expelled pressure fluid can escape into the surrounding chamber 44, and then re-enter the cylinder on the return stroke. Slots 43 should preferably be triangular, so that the damping action may vary in its effect according to the travel of plunger 38. It will be found advantageous to mount cylinder 37 by means of swivel joint 40, on a drain plug 45, which closes the outlet for the pressure fluid.

In the example illustrated in FIGURE 2, control disc 12 is shown as a notched disc, round the periphery of which radial slots can be provided, the spacing between the slots corresponding to that of the pins which convey the drive to the border perforations on the run of paper. This disc serves to count off whatever number of marks corresponds to the prescribed length of advance. Just before this length has been fed forward, a contact is made, which operates magnet 23 and so causes shock-absorbing pawl 20 to engage. As the final mark is reached pawl 30 is operated by magnet 41, so that the feed mechanism is brought smoothly to a halt at a precisely pre-determined position.

Figure 4:
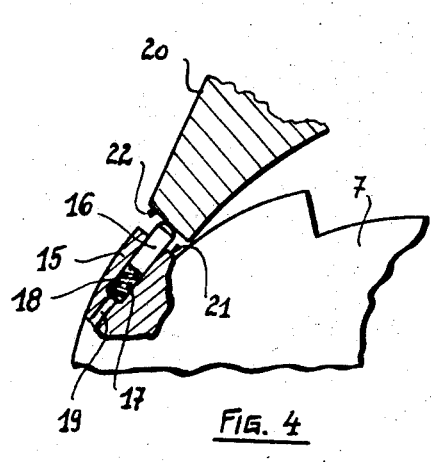
FIGURE 4 is a diagrammatic cross-section through a damping device within a ratchet tooth.

In the example illustrated in FIGURE 4, another possible form of shock absorption is shown, the drawing being confined to a side view of a portion of ratchet wheel 7. As can be observed, each tooth 15 of wheel 7 contains a plunger-like pin 16, on the free end of which the engagement face 22 of pawl 20 acts. The impact of the pawl 20 causes plunger pin 16 to move into tooth 15 against the action of spring 17 and of a pressure fluid contained in chamber 18. The expelled fluid can escape through exit nozzle 19 and return by convenient means to chamber 18. With the aid of the pin 16, the impact shock between pawl 20 and engagement face 21 of the particular tooth 15, is considerably damped. The friction in coupling 4–10 is sufficient to result in a well-defined terminal position between pawl 20 and ratchet tooth 15, with the two engagement faces 21 and 22 in conatct with each other.

Figure 5:
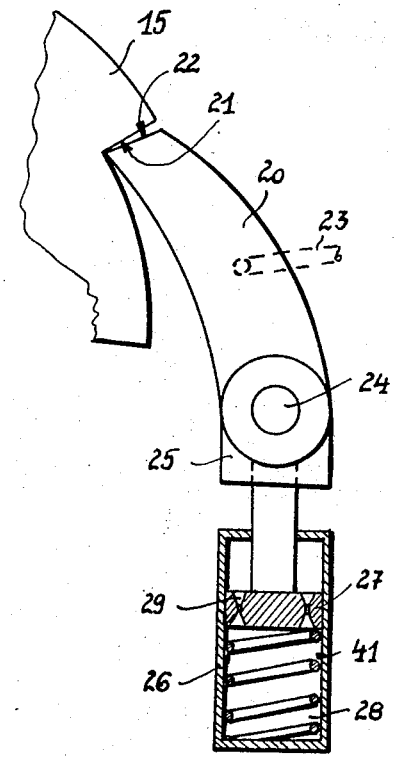
FIGURE 5 is a diagrammatic side view of a spring-load pawl.

The example illustrated in FIGURE 5 represents a reversal of the invention principle shown in FIGURE 4, pawl 20 being spring-loaded, whereas no damping is provided at ratchet tooth 15 itself. Pawl 20 pivots about bearing 24. The pawl 20 can be swung upwards and downwards by means of control rod 23. The shock of impact between engagement faces 21 and 22 is transmitted by pawl 20 to bearing 24, at which lies compression rod 25, which carries a plunger 27, working in shock absorber 26. A shock absorber such as 26 may be designed to act on the principle of shock-absorbing door closers, for example. plunger 27 being driven into cylinder 26 against the action of spring 28. When plunger 27 is moved in opposition to spring 28 by ratchet tooth 15, pressure fluid within cylinder 26 is driven—through valve 29, for example—into the space on the opposite side of plunger 27. To enable ratchet wheel 7 to be accurately poistioned, stop 41 may for example be provided in cylinder 26, no further movement being possible after plunger 27 has reached this stop. When pawl 20 is moved upwards by rod 23 and out of engagement with ratchet tooth 15, spring 28 can restore plunger 27 to its original position. The pressure fluid expelled during this movement can be led by way of another valve (not shown), such as another ball valve 29, back to the spring side of plunger 27, so that the plunger is ready for the next shock-absorbing action.

It has been found that the provision of such or similar shock absorbing devices prevents the occurrence of torsional oscillation and so makes it possible for the machine concerned to be driven at a considerably higher speed. The use of eddy-current braking, for example, or damping devices operating on a similar principle, may prove advantageous.

When the mechanism proposed according to the invention is used on high-speed cutting machines, it has been observed that the accuracy of cut, even at the highest speeds, leaves nothing to be desired and that the border perforations in a run of paper do not shift appreciably in relation to their feed mechanism.

What I claim is:

1. An apparatus for intermittently driving a load, comprising:
   a continuously rotating drive shaft;
   a driven shaft in continuous frictional entrainment with said driven shaft;
   a ratchet wheel carried by said driven shaft and provided with a multiplicity of teeth; and
   a shock-absorbing arresting pawl selectively engageable with said teeth for terminating rotation of said driven shaft, said teeth and said arresting pawl having engagement surfaces contacting upon operation of said arresting pawl, at least one of the contacting surfaces being yieldable upon engagement of said arresting pawl with a respective tooth of said wheel, said one of said surfaces being provided with spring means biasing it against the yielding movement, and fluid damping means resisting said movement, said fluid damping means including a plunger connected with said one of said surfaces and displaceable therewith, and a fluid cylinder slidably receiving said plunger, said cylinder being provided with at least one outlet for said fluid of triangular configuration, said plunger cooperating with said outlet for varying the effective cross-section thereof upon movement of said plunger in said cylinder.

2. The apparatus defined in claim 1 wherein said spring means is a coil spring mounted in said cylinder and bearing upon said plunger.

3. The apparatus defined in claim 2 wherein said arresting pawl comprises a support rotatable relatively to said ratchet wheel about the axis thereof, a pin carried by said support and engageable with the teeth of said wheel, and means connecting said support with said plunger for damping angular movement of said support.

References Cited

UNITED STATES PATENTS

| | | | |
|---|---|---|---|
| 1,067,130 | 7/1913 | Newell | 188—88.53 |
| 1,821,787 | 9/1931 | Black | 188—88.53 |
| 2,014,234 | 9/1935 | Klocke | 192—149 X |
| 3,047,288 | 7/1962 | Ramm | 192—12 X |
| 3,051,285 | 8/1962 | West et al. | 192—24 X |
| 3,221,855 | 12/1965 | Newlin | 192—12 X |

BENJAMIN W. WYCHE III, *Primary Examiner.*